(12) United States Patent
Scroggie et al.

(10) Patent No.: US 8,671,527 B2
(45) Date of Patent: Mar. 18, 2014

(54) FASTENER ASSEMBLY

(75) Inventors: Derek Scroggie, Macomb, MI (US);
Robert Osterland, East China, MI (US);
Keith Morris, Grand Blanc, MI (US)

(73) Assignee: Illinois Tool Works Inc., Glenview, IL (US)

( * ) Notice: Subject to any disclaimer, the term of this patent is extended or adjusted under 35 U.S.C. 154(b) by 606 days.

(21) Appl. No.: 12/860,689

(22) Filed: Aug. 20, 2010

(65) Prior Publication Data

US 2011/0058915 A1 Mar. 10, 2011

Related U.S. Application Data

(63) Continuation-in-part of application No. PCT/US2009/033886, filed on Feb. 12, 2009.

(60) Provisional application No. 61/030,731, filed on Feb. 22, 2008.

(51) Int. Cl.
*F16B 19/10* (2006.01)
*A44B 17/00* (2006.01)

(52) U.S. Cl.
USPC .............................. 24/297; 24/453; 411/508

(58) Field of Classification Search
USPC .......... 24/297, 453, 455, 458; 411/24, 43–46, 411/508–510, 908, 913
See application file for complete search history.

(56) References Cited

U.S. PATENT DOCUMENTS 3,678,797 A * 7/1972 Seckerson ............... 411/509
4,524,494 A * 6/1985 Sato et al. ............... 24/453
4,778,320 A * 10/1988 Nakama ................ 411/509
4,796,523 A 1/1989 Mette
4,810,147 A * 3/1989 Hirohata ............... 411/349
5,005,471 A 4/1991 Dreano
5,319,839 A * 6/1994 Shimajiri ............... 24/453

(Continued)

FOREIGN PATENT DOCUMENTS

DE 3610124 C1 7/1987
EP 0334782 A1 9/1989

(Continued)

OTHER PUBLICATIONS

ISR for PCT/US09/033886 dated Jun. 15, 2009.

(Continued)

*Primary Examiner* — Robert J Sandy
*Assistant Examiner* — Tyler Johnson
(74) *Attorney, Agent, or Firm* — Lowe Hauptman & Ham LLP

(57) ABSTRACT

A fastener adapted to join a first component to a second component. The fastener includes a first connecting end adapted to engage a slot opening in the first component, and a second connecting end adapted for press-fit insertion into an opening in the second component. The first connecting end includes a raised edge collar defining a concave surface facing away from the second connecting end and an opposing platform surface disposed above the raised edge collar in spaced relation to the raised edge collar with a post member extending between the raised edge collar and the opposing platform surface. The first connecting end is adapted to hold the first component in sandwiched relation between the raised edge collar and the opposing platform surface. The raised edge collar includes a segmented perimeter wall including a plurality of cut-outs defining substantially independently flexible segments between the cut-outs.

10 Claims, 5 Drawing Sheets

(56) References Cited

U.S. PATENT DOCUMENTS

| | | | |
|---|---|---|---|
| 5,551,817 A | 9/1996 | Kanie | |
| 5,573,362 A * | 11/1996 | Asami et al. | 411/509 |
| D378,349 S * | 3/1997 | Saito et al. | D8/382 |
| D381,258 S * | 7/1997 | Saito | D8/382 |
| 5,704,753 A * | 1/1998 | Ueno | 411/509 |
| 6,572,317 B2 * | 6/2003 | Okada et al. | 411/508 |
| 6,575,681 B2 * | 6/2003 | Kojima et al. | 411/508 |
| 6,715,185 B2 * | 4/2004 | Angellotti | 24/297 |
| 6,974,292 B2 * | 12/2005 | Hansen | 411/508 |
| 7,017,239 B2 * | 3/2006 | Kurily et al. | 24/297 |
| 7,073,230 B2 * | 7/2006 | Boville | 24/297 |
| 7,114,221 B2 * | 10/2006 | Gibbons et al. | 24/289 |
| 7,152,281 B2 * | 12/2006 | Scroggie | 24/297 |
| 7,257,867 B2 * | 8/2007 | Mizukoshi et al. | 24/297 |
| 7,306,419 B2 * | 12/2007 | Lepper | 411/508 |
| 7,351,023 B2 * | 4/2008 | Scroggie et al. | 411/508 |
| 7,549,829 B2 * | 6/2009 | Okada et al. | 411/508 |
| 7,549,830 B2 * | 6/2009 | Cooley et al. | 411/508 |
| 7,698,787 B2 * | 4/2010 | Scroggie et al. | 24/297 |
| 7,748,089 B2 * | 7/2010 | Jalbert et al. | 24/297 |
| 7,878,749 B2 * | 2/2011 | Edland | 411/508 |
| 7,967,539 B2 * | 6/2011 | Huet | 411/508 |
| 8,333,540 B2 * | 12/2012 | Nakazato | 411/508 |
| 8,495,802 B2 * | 7/2013 | Okada et al. | 24/297 |
| 8,511,631 B2 * | 8/2013 | Kato et al. | 248/316.7 |
| 2002/0028123 A1 * | 3/2002 | Miura et al. | 411/508 |
| 2002/0037206 A1 * | 3/2002 | Okada et al. | 411/508 |
| 2002/0106261 A1 * | 8/2002 | Nakanishi | 411/508 |
| 2002/0131846 A1 * | 9/2002 | Kojima et al. | 411/508 |
| 2004/0016088 A1 * | 1/2004 | Angellotti | 24/297 |
| 2004/0052612 A1 * | 3/2004 | Miura | 411/508 |
| 2005/0034282 A1 * | 2/2005 | Kurily et al. | 24/297 |
| 2005/0079033 A1 * | 4/2005 | Benedetti et al. | 411/508 |
| 2005/0244250 A1 * | 11/2005 | Okada et al. | 411/508 |
| 2006/0231690 A1 * | 10/2006 | Cooley et al. | 248/71 |
| 2006/0242802 A1 * | 11/2006 | Scroggie | 24/297 |
| 2007/0166127 A1 * | 7/2007 | Scroggie et al. | 411/508 |
| 2007/0217890 A1 * | 9/2007 | Scroggie et al. | 411/508 |
| 2007/0258795 A1 * | 11/2007 | Nakazato | 411/508 |
| 2008/0066266 A1 * | 3/2008 | Scroggie et al. | 24/297 |
| 2008/0166206 A1 * | 7/2008 | Edland | 411/510 |
| 2008/0298890 A1 * | 12/2008 | Koike | 403/408.1 |
| 2009/0060681 A1 * | 3/2009 | Nakanishi | 411/509 |
| 2009/0218464 A1 * | 9/2009 | Kato et al. | 248/316.7 |
| 2009/0252573 A1 * | 10/2009 | Nakazato | 411/510 |
| 2011/0058915 A1 * | 3/2011 | Scroggie et al. | 411/32 |
| 2012/0014766 A1 * | 1/2012 | Kirchen et al. | 411/508 |
| 2012/0174345 A1 * | 7/2012 | Scroggie et al. | 24/297 |

FOREIGN PATENT DOCUMENTS

| | | |
|---|---|---|
| EP | 1439313 A2 | 7/2004 |
| FR | 1465708 A | 3/1967 |
| FR | 2682582 A1 | 4/1993 |

OTHER PUBLICATIONS

French Search Report for FR 0801188 dated Jul. 21, 2008.

* cited by examiner

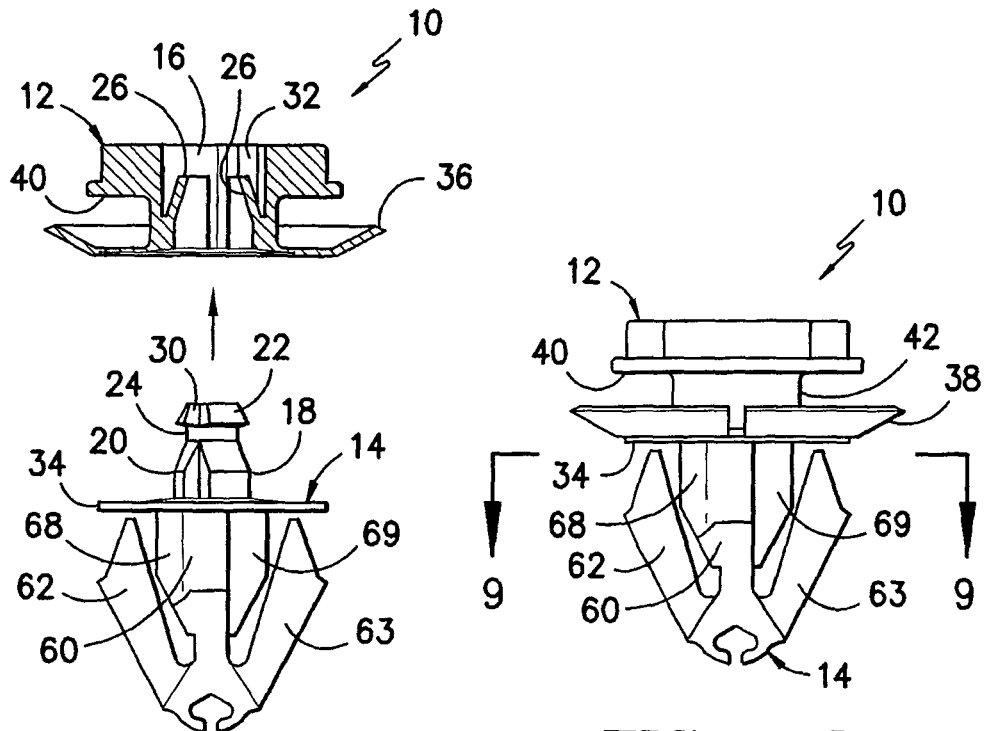
FIG. -1-
FIG. -2-
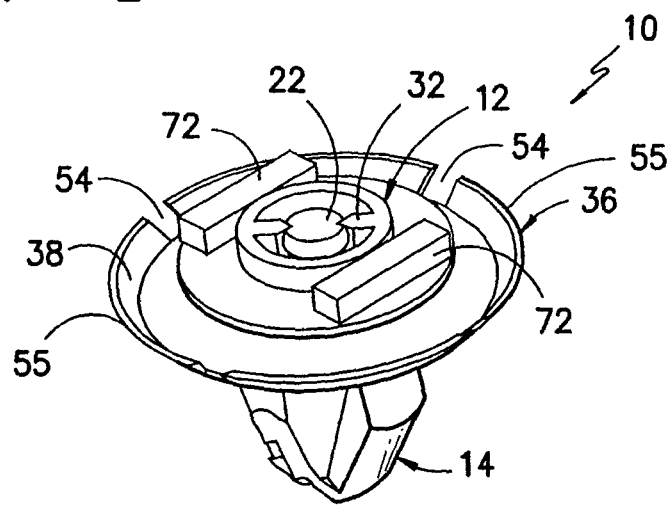
FIG. -3-

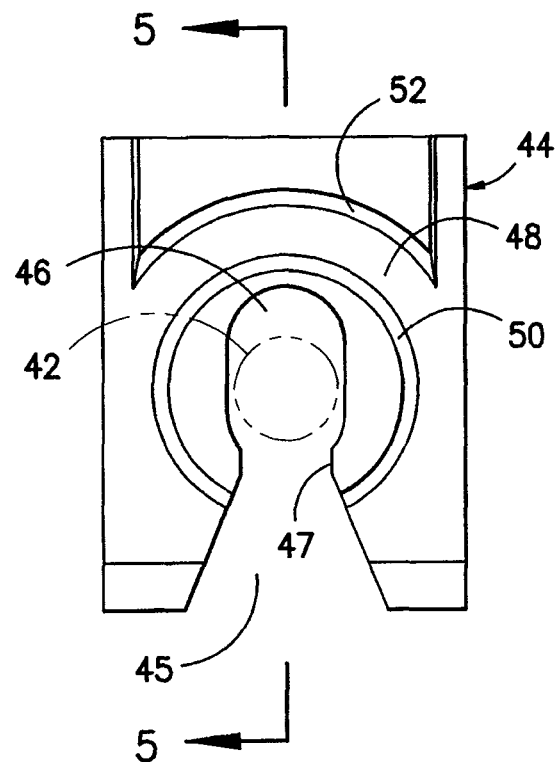
FIG. -4-
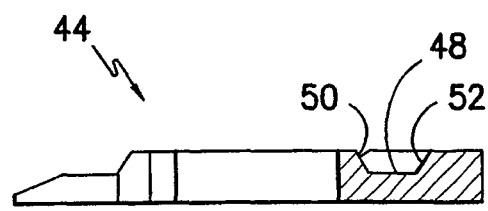
FIG. -5-

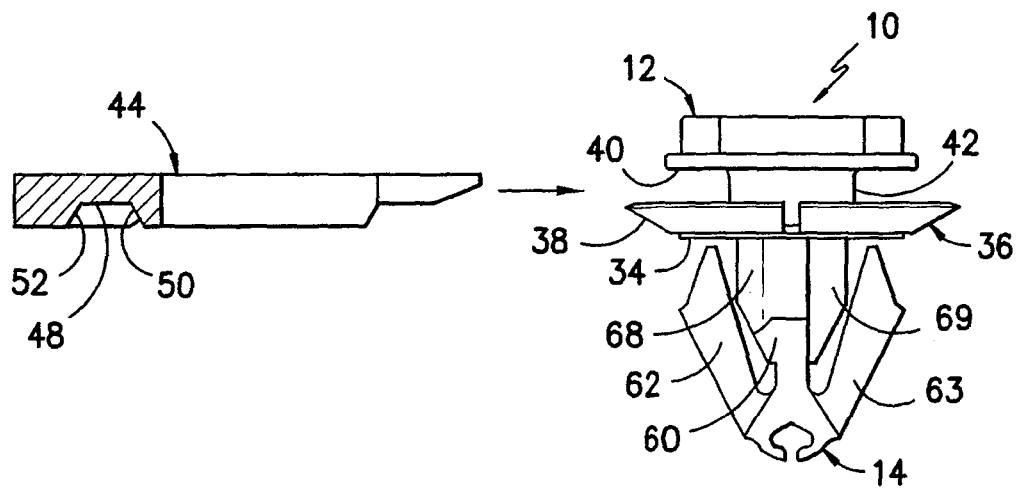
FIG. -6-
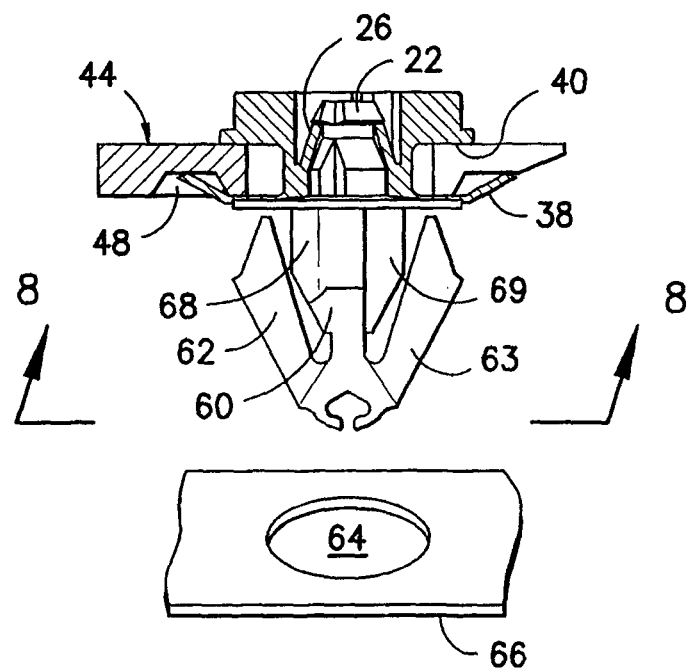
FIG. -7-

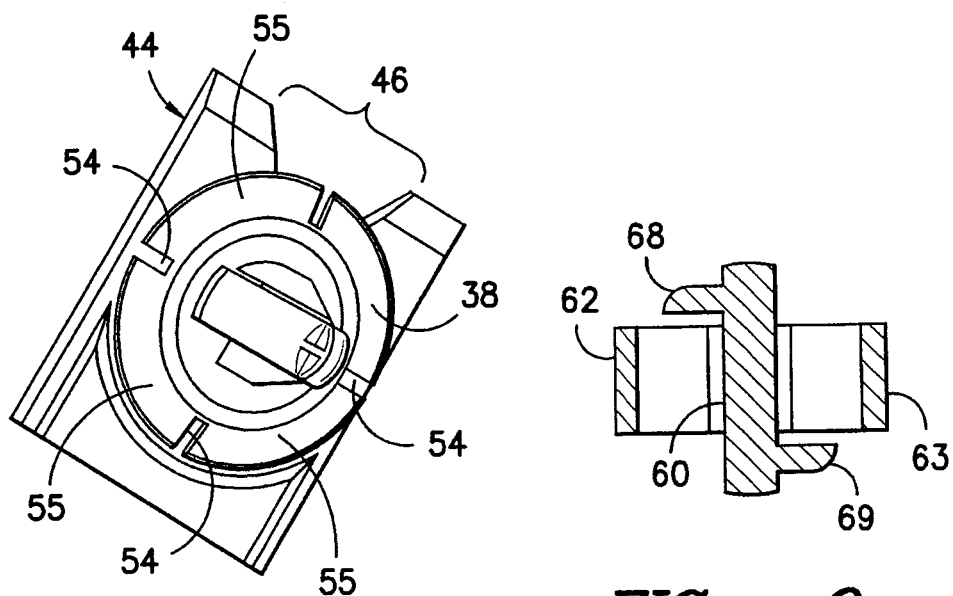
FIG. -8-
FIG. -9-
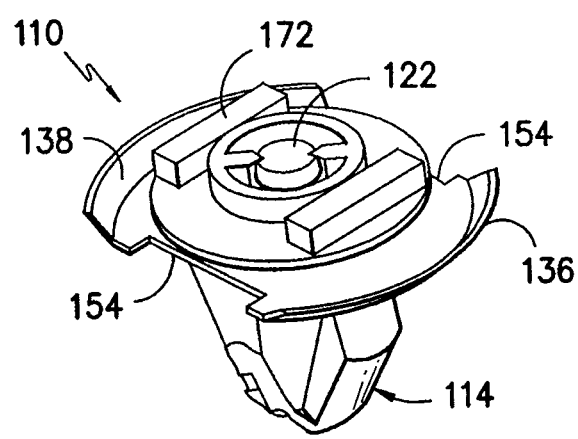
FIG. -10-

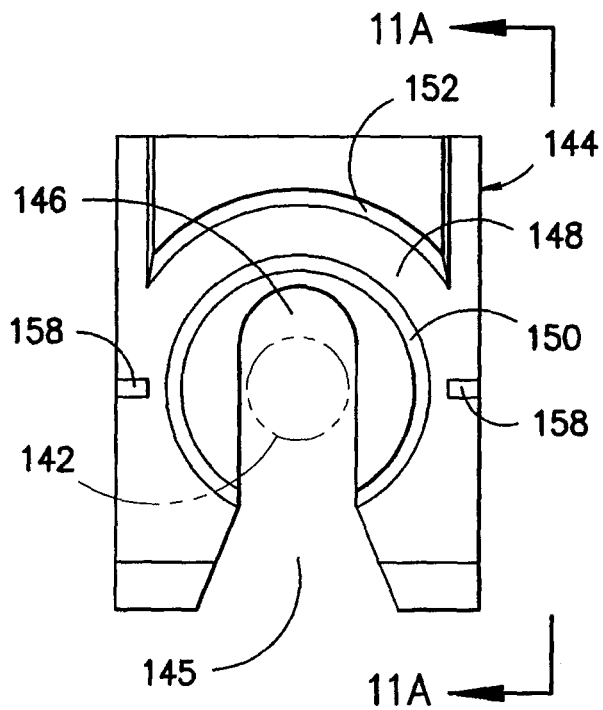
FIG. -11-
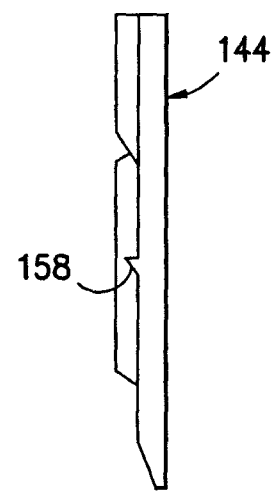
FIG. -11A-
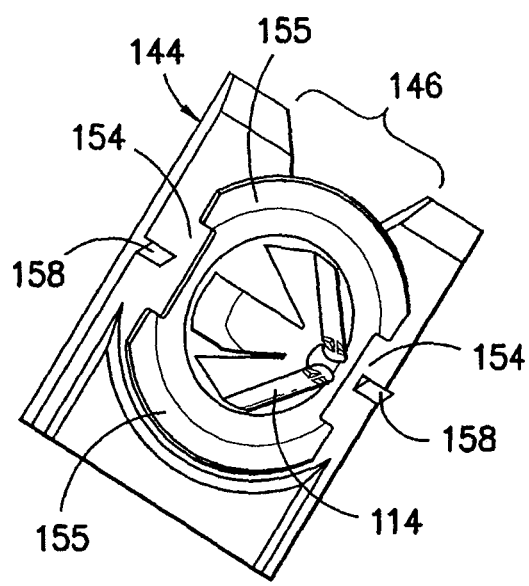
FIG. -12-

FASTENER ASSEMBLY

CROSS-REFERENCE TO RELATED APPLICATION

This Application is a continuation-in-part of PCT/US09/033886 filed Feb. 12, 2009 and claims the benefit of U.S. Provisional Application Ser. No. 61/030,731 filed Feb. 22, 2008, the contents of which are hereby incorporated by reference as if fully set forth herein.

FIELD OF THE INVENTION

The present invention relates generally to fasteners used as an intermediate connector between a first component and a second component disposed in juxtaposed relation to one another. More particularly, the present invention relates to push-through fasteners including a head portion adapted to engage a first component in a defined orientation and a base portion extending away from the head portion and adapted to engage a second component such as a panel or other structure.

BACKGROUND OF THE INVENTION

In many assemblies, it is necessary to connect one panel or object to another panel or object. For example, in the assembly of automobiles, various panels and structures are often connected to other panels or structures or to the automobile frame. To facilitate assembly, it is known to use snap-together type fasteners. Also, it is known to preassemble the fastener with one of the components and to thereafter connect the second component to the fastener during final assembly. It is known that such fasteners may have a base structure having a generally "W" shaped configuration. In using such fasteners, the head of the fastener may be attached to an attachment structure such as a doghouse, return flange or the like on one component with the W-base projecting outwardly for insertion in an opening within the second component to complete the connection.

The parts connected by fasteners of this type are often manufactured in different facilities by different manufacturing techniques. Fasteners connected to one component may have a tendency to become dislodged during shipping and handling prior to connecting to the other component. Moreover, changes in environmental conditions may give rise to expansion or contraction of the fastener and/or the component to which it is attached. Such relative expansion and contraction may move the fastener out of its desired position. The ability of the fastener to be held within a desired position within the attachment structure while also permitting a degree of movement accommodating thermal expansion and contraction aids in making the final assembly. This may be particularly true when the assembly is a so-called "blind" assembly wherein the assembler does not see the fasteners enter the holes in the mating panel or other component.

A number of prior component connection devices and techniques are known and disclosed in the art. These include the connection devices and techniques disclosed in U.S. Pat. Nos. 6,715,185; 7,017,239; 7,152,281; and U.S. Application No. 2007/0166127, all of which are incorporated by reference as if fully set forth herein. While each of these constructions provides various benefits, further improvements may nonetheless be desirable. In particular, improved constructions providing enhanced resistance to displacement between the attachment structure and the fastener while nonetheless accommodating expansion may be desirable. Constructions providing enhanced stability of the base portion may also be desirable for some applications.

SUMMARY OF THE INVENTION

In accordance with one aspect, the present invention provides a fastener adapted to join a first component to a second component. The fastener includes a first connecting end adapted to engage a slot opening in the first component, and a second connecting end adapted for press-fit insertion into an opening in the second component. The first connecting end includes a raised edge collar defining a concave surface facing away from the second connecting end and an opposing platform surface disposed above the raised edge collar in spaced relation to the raised edge collar with a post member extending between the raised edge collar and the opposing platform surface. The first connecting end is adapted to hold the first component in sandwiched relation between the raised edge collar and the opposing platform surface. The raised edge collar includes a segmented perimeter wall including a plurality of cut-outs defining substantially independently flexible segments between the cut-outs.

In accordance with another aspect, the present invention provides a fastener assembly including a first component including a slot opening and having a contoured face including a depressed channel extending in a pattern disposed radially outboard from the slot opening. The assembly further includes a fastener adapted to join the first component to a second component. The fastener includes a first connecting end held at the slot opening in the first component, and a second connecting end adapted for press-fit insertion into an opening in the second component. The first connecting end includes a raised edge collar defining a concave surface facing away from the second connecting end and an opposing platform surface disposed above the raised edge collar in spaced relation to the raised edge collar. A post member extends between the raised edge collar and the opposing platform surface, the raised edge collar includes a segmented perimeter wall with a plurality of cut-outs defining substantially independently flexible segments between the cut-outs. The first component is disposed in sandwiched relation between the raised edge collar and the opposing platform surface with at least a portion of the raised edge collar disposed within the depressed channel at the contoured face across the first component. The second connecting end includes a pair of compressible wing elements extending upwardly away from a distal end of a central post structure with the compressible wing elements being moveable along travel paths towards and away from the central post structure. The second connecting end further includes a first lateral rib projecting outwardly from a first side of the central post structure in a first direction and a second lateral rib projecting outwardly from a second side of the central post structure in a second direction where the first direction is substantially opposite from the second direction. The first lateral rib and the second lateral rib are each disposed in planes outside of the travel paths defined by the wing elements, with the first lateral rib and the second lateral rib being disposed on opposite sides of the travel paths defined by the wing elements.

BRIEF DESCRIPTION OF THE DRAWINGS

FIG. 1 is a cut-away exploded view illustrating an exemplary embodiment of a fastener consistent with the present invention;

FIG. 2 is an assembled view of the fastener illustrated in FIG. 1;

FIG. 3 is an elevation perspective view of the assembled fastener illustrated in FIG. 2;

FIG. 4 is a view illustrating a contoured underside of an exemplary attachment structure adapted to engage the assembled fastener illustrated in FIG. 2;

FIG. 5 is a view taken generally along line 5-5 in FIG. 4;

FIG. 6 is an assembly view illustrating engagement of the attachment structure as illustrated in FIG. 4 with the assembled fastener illustrated in FIG. 2;

FIG. 7 is a view illustrating the assembled fastener in assembled relation with an attachment structure as illustrated in FIG. 4 and oriented for insertion through an opening in an underlying panel;

FIG. 8 is a view taken generally along line 8-8 in FIG. 7;

FIG. 9 is a view taken generally along line 9-9 in FIG. 2;

FIG. 10 is a view similar to FIG. 3, illustrating another embodiment of an exemplary fastener consistent with the present invention;

FIG. 11 is a view similar to FIG. 5 illustrating an exemplary attachment structure adapted for acceptance and retention of the exemplary fastener of FIG. 10;

FIG. 11A is a view taken generally along line 11A-11A illustrating an exemplary locking feature disposed at the underside of the attachment structure illustrated in FIG. 11; and FIG. 12 is a view similar to FIG. 8 illustrating the exemplary fastener of FIG. 10 within the attachment structure of FIG. 11.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the drawings, wherein to the extent possible, like elements are designated by like reference numerals throughout the various views. Looking jointly to FIGS. 1-3, a fastener 10 is illustrated. As shown, the fastener 10 includes a head portion 12 defining a first connecting end and a body portion 14 defining a second connecting end projecting away from the head portion. In the illustrated exemplary arrangement, the head portion 12 includes a female acceptance channel 16 adapted to receive a male member 18 projecting upwardly along a central axis of the body portion 14.

In the illustrated construction, the male member 18 includes a base portion 20 and a chamfered distal tip 22 separated by a reduced diameter neck 24. During assembly, the chamfered distal tip 22 is inserted into the female acceptance channel 16 and is pressed inwardly to engage an arrangement of flexible locking prongs 26 that are angled upwardly away from the perimeter wall of the female acceptance channel 16. As the chamfered distal tip 22 passes the flexible locking prongs 26, the prongs are pushed towards the walls of the female acceptance channel 16. Once the chamfered distal tip 22 has passed the locking prongs 26, the locking prongs 26 snap back into place around the reduced diameter neck 24 thereby blocking withdrawal of the body portion 14. As illustrated through joint reference to FIGS. 1 and 3, the male member 18 may include an arrangement of elongate surface grooves 30 arranged about the perimeter of the male member 18. In the illustrated arrangement, the elongate surface grooves 30 are arranged for keyed alignment with rib elements 32 extending along the perimeter wall of the female acceptance channel 16. The keyed alignment between the rib elements 32 and the elongate surface grooves 30 promotes insertion of the male member 18 in proper orientation and prevents rotational change once the connection is complete.

In the illustrated exemplary construction, the body portion 14 includes a body flange 34 which is disposed in surrounding relation to the base portion 20. Upon insertion of the male member 18 into the female acceptance channel 16, the body flange 34 seats against the underside of a raised edge collar 36. As best illustrated through joint reference to FIGS. 2 and 3, the illustrated raised edge collar 36 has a generally dish-like concave configuration with a segmented perimeter wall 38 extending at least partially around the exterior of the female acceptance channel 16. As illustrated in FIG. 2, the rim of the perimeter wall 38 is spaced apart from an opposing platform surface 40 to define a neck structure 42 in the form of a post extending between the raised edge collar 36 and the opposing platform surface 40. As will be appreciated, while the fastener 10 has been illustrated and described in relation to a two-piece construction that is snapped together, it is likewise contemplated that a the fastener 10 may be formed as a single piece if desired. It is also contemplated that the fastener 10 may be formed as three or more pieces if desired.

FIG. 4 illustrates an exemplary attachment structure 44 for use in attaching the fastener 10 to a trim panel or other component. As shown, the exemplary attachment structure 44 includes an acceptance slot 46 adapted to accept the neck structure 42 of the head portion 12 in a manner as will be described further hereinafter. In the illustrated arrangement, a depressed channel 48 is disposed radially outwardly from the acceptance slot 46 in partial circumferential surrounding relation to the acceptance slot 46. The depressed channel 48 has a pattern generally matching at least a segment of the perimeter wall 38 of the raised edge collar 36. In the illustrated arrangement, a portion of the depressed channel 48 is bounded by an inboard raised border 50 and by an outboard raised border 52 along at least a segment of its length. The depressed channel 48 is oriented to accept the rim of the raised edge collar 36 upon engagement between the fastener 10 and the attachment structure 44 as will now be described.

Referring now jointly to FIGS. 4 and 6-8, it may be seen that the fastener 10 in assembled condition is slidable into a slot opening 45 to reside within the acceptance slot 46 of the attachment structure 44. In this arrangement, the post defining the neck structure 42 of the connector 10 is housed between the opposing lateral sides of the acceptance slot 46. As seen through reference to FIG. 4, the neck structure 42 (shown in phantom) has an outer diameter which is slightly smaller than the width of the acceptance slot 46. In this arrangement the neck structure 42 is permitted to float within the acceptance slot 46. The fastener thus has a degree of movement which aids in accommodating thermal expansion and manipulation during subsequent insertion into an adjacent opening. In the exemplary arrangement illustrated in FIG. 4, a constricted throat opening 47 is positioned at the base of the acceptance slot 46. While the neck structure 42 can be pushed past the constricted throat opening 47 during assembly or disassembly, the neck structure 42 is prevented from inadvertently falling out of the acceptance slot 46 during shipment or use in the absence of an intentional applied removal force.

As best seen through joint reference to FIGS. 7 and 8, when the installation is complete, a portion of the rim of the perimeter wall 38 of the raised edge collar 36 is disposed within the depressed channel 48 between the inboard raised border 50 and the outboard raised border 52. This nested relation between the perimeter wall 38 and the depressed channel 48 enhances the positional stability of the fastener 10 relative to the attachment structure 44. The raised edge collar 36 is typically formed of a substantially resilient material such as plastic, spring steel, or the like, thereby providing a degree of flexibility to the raised edge collar 36. As best seen through joint reference to FIGS. 3 and 8, in the exemplary construction, the perimeter wall 38 of the raised edge collar 36 is segmented and includes an arrangement of cutouts 54 arranged around the perimeter thereby defining an arrangement of flexible fins 55 located between the cutouts 54 which may flex independently from one another. As will be appreciated, during the engagement between the attachment structure 44 and the fastener 10, the individual fins 55 may bend downwardly in a spring like manner as required to facilitate insertion during the procedure as shown in FIG. 6. Upon achieving the installed relation illustrated in FIG. 7, the fins 55 apply a rebounding force thereby urging the attachment structure 44 towards the opposing platform surface 40 and thus promoting a controlled relationship. Moreover, the segmented raised edge collar 36 adapts to dimensional changes in the attachment structure 44 which may occur as a result of thermal expansion and contraction. Specifically, as the attachment structure 44 undergoes thermal expansion or contraction, the segments of the perimeter wall 38 may flex as required to accommodate that expansion or contraction while nonetheless maintaining a biasing force upwardly against the attachment structure 44.

As best illustrated through joint reference to FIGS. 1, 2, and 9, in the exemplary construction the body portion 14 of the fastener 10 is of a generally "W" base configuration. This construction includes a central post structure 60 with a first wing element 62 and a second wing element 63 extending upwardly and away from the distal end of the central post structure 60. The wing elements 62, 63 are adapted to flex inwardly to permit passage through an opening 64 in a panel 66 or other component (FIG. 7). Upon insertion, the wing element 62 press outwardly against the sides of the opening 64 to hold the panel 66 in place in a manner as will be well known to those of skill in the art.

In the illustrated exemplary construction, the central post structure 60 includes a first lateral rib 68 projecting outwardly from the central post structure and a second lateral rib 69 projecting in a direction opposite from the first lateral rib. As best illustrated in FIG. 9, the first lateral rib 68 and the second lateral rib 69 are arranged in substantially parallel planes on opposite sides of the wing elements 62, 63 to form a substantially "Z" shaped or "S" shaped elevation profile. In the illustrated exemplary construction, the first lateral rib 68 is disposed in a plane oriented generally behind the first wing element 62 and the second lateral rib 69 is oriented in a plane generally in front of the second wing element 63. In this arrangement, the first wing element 62 and the second wing element 63 may be compressed inwardly along arced travel paths towards the central post structure 60 without engaging the lateral ribs 68, 69.

In use of the fastener 10, it may be desirable from time to time to disengage the connection between the fastener 10 and the panel 66 or other component. This disengagement is carried out by the forced compression of the wing elements 62, 63 to permit release from the panel 66. During this removal procedure, the lateral ribs 68, 69 may aid in maintaining the centered position of the fastener 10 within the opening 64 such that the fastener does not become tilted to an excessive degree. This aids in providing a straight line removal thereby avoiding the application of undue bending stresses to the body portion 14. While removal of the fastener 10 may be carried out as described with the fastener 10 maintained in a substantially unitary construction, it is likewise possible to separate pieces of a multi-piece fastener to allow for disengagement. By way of example only, and not limitation, in the event that the fastener 10 is of a two-piece construction as illustrated in FIG. 1, the fastener may be disengaged by separating under a designed controlled force to apply sufficient force to pull the head portion 12 away from the body portion 14.

The present invention is also adapted to provide control over the rotational orientation of the fastener relative to the attachment structure. By way of example only and not limitation, FIG. 3 illustrates the use of rectangular travel guides 72 across the surface of the head portion 12. These travel guides present a generally rectangular raised profile which may engage a mating depression in a component (not shown) in operative connection to the attachment structure 44 to ensure that the fastener 10 and the attachment structure 44 are adjoined in a predefined desired relation.

The configuration of the raised edge collar also may be adjusted to facilitate a predefined directional orientation for insertion into the attachment structure. By way of example only, and not limitation, FIG. 10 illustrates an exemplary construction for a fastener 110, wherein elements corresponding to elements previously described are designated by like reference numerals within a 100 series. In this configuration, the raised edge collar 136 includes extended length cutouts 154 extending along opposing lateral edges. Such extended length cutouts provide the raised edge collar 136 with a substantially rectangular configuration which may be desirable in some environments of use to facilitate orientation relative to the attachment structure.

The exemplary fastener 110 as illustrated in FIG. 10 may be used in conjunction with an attachment structure 44 as illustrated and described in relation to FIG. 4. Alternatively, the exemplary fastener 110 as illustrated in FIG. 10 may be used in conjunction with an attachment structure 144 as illustrated in FIG. 11 wherein elements corresponding to those previously described are designated by like reference numerals increased by 100. As will be appreciated, the attachment structure 144 does not incorporate a constricted throat to block passage of the neck structure 142(shown in phantom). Rather, the attachment structure 144 includes one or more blocking detents 158 that are positioned to reside within the extended length cutouts 154 of fastener 110 as shown in FIG. 12. The blocking detents 158 serve to block the fastener 110 against withdrawal along the acceptance slot 146. By way of example only, and not limitation, the blocking detents may have a ramp configuration as shown in FIG. 11A. When used in conjunction with the fastener 110, the segments of the perimeter wall 138 can pass over the blocking detents 158 during initial insertion of the fastener into the acceptance slot 146. Once the fastener 110 is in position, a degree of movement by the fastener along the acceptance slot 146 is permitted. However, upon attempted retreat of the fastener 110 along the acceptance slot 146, such retreat will be blocked by the blocking detents 158. Of course, blocking elements other than ramps may likewise be utilized if desired.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. the claims are to be construed to include alternative embodiments and equivalents to the extent permitted by the prior art.

Various features of the invention are set forth in the following claims.

What is claimed is:

1. A fastener assembly comprising:
a first component including a slot opening;
the first component having a contoured face including a depressed channel extending in a pattern disposed radially outboard from the slot opening; and
a fastener adapted to join the first component to a second component, the fastener including a first connecting end held at the slot opening in the first component, and a second connecting end adapted for press-fit insertion into an opening in the second component;
the first connecting end including a raised edge collar defining a concave surface facing away from the second connecting end and an opposing platform surface disposed above the raised edge collar in spaced relation to the raised edge collar, a post member extending between the raised edge collar and the opposing platform surface, the raised edge collar including a segmented perimeter wall including a plurality of cut-outs defining substantially independently flexible segments between the cut-outs, the first component being disposed in sandwiched relation between the raised edge collar and the opposing platform surface,
wherein the fastener has a multi-part construction, and
wherein the first connecting end is adjoined to the second connecting end in a snap-fit relation.

2. The fastener assembly as recited in claim 1, wherein the raised edge collar is substantially circular.

3. The fastener assembly as recited in claim 1, wherein the raised edge collar includes a pair of cut-outs extending along lateral edges of the raised edge collar.

4. The fastener assembly as recited in claim 1, wherein the second connecting end includes a pair of compressible wing elements extending upwardly away from a distal end of a central post structure extending downwardly from the raised edge collar, the compressible wing elements being moveable along travel paths towards and away from the central post structure.

5. The fastener assembly as recited in claim 4, wherein the second connecting end further includes a pair of lateral ribs projecting outwardly from opposing sides of the central post structure, the lateral ribs being disposed on opposite sides of the travel paths defined by the wing elements.

6. A fastener assembly comprising:
a first component including a slot opening; and
a fastener adapted to join the first component to a second component, the fastener including a first connecting end held at the slot opening in the first component, and a second connecting end adapted for press-fit insertion into an opening in the second component;
the first connecting end including a raised edge collar defining a concave surface facing away from the second connecting end and an opposing platform surface disposed above the raised edge collar in spaced relation to the raised edge collar, a post member extending between the raised edge collar and the opposing platform surface, the raised edge collar including a segmented perimeter wall including a plurality of cut-outs defining substantially independently flexible segments between the cut-outs, the first component being disposed in sandwiched relation between the raised edge collar and the opposing platform surface,
wherein the second connecting end includes a pair of compressible wing elements extending upwardly away from a distal end of a central post structure extending downwardly from the raised edge collar, the compressible wing elements being moveable along travel paths towards and away from the central post structure,
wherein the first component includes at least one locking detent extending away from a face engaging the raised edge collar, said at least one locking detent adapted to project through a corresponding one of said plurality of cut-outs when the first component is disposed in sandwiched relation between the raised edge collar and the opposing platform surface.

7. The fastener assembly as recited in claim 6, wherein said at least one locking detent has a ramp configuration.

8. A fastener assembly comprising:
a first component including a slot opening, the first component having a contoured face including a depressed channel extending in a pattern disposed radially outboard from the slot opening; and
a fastener adapted to join the first component to a second component, the fastener including a first connecting end held at the slot opening in the first component, and a second connecting end adapted for press-fit insertion into an opening in the second component;
the first connecting end including a raised edge collar defining a concave surface facing away from the second connecting end and an opposing platform surface disposed above the raised edge collar in spaced relation to the raised edge collar, a post member extending between the raised edge collar and the opposing platform surface, the raised edge collar including a segmented perimeter wall including a plurality of cut-outs defining substantially independently flexible segments between the cut-outs, the first component being disposed in sandwiched relation between the raised edge collar and the opposing platform surface with at least a portion of the raised edge collar disposed within the depressed channel at the contoured face across the first component;
the second connecting end including a pair of compressible wing elements extending upwardly away from a distal end of a central post structure, the compressible wing elements being moveable along travel paths towards and away from the central post structure, the second connecting end further including a first lateral rib projecting outwardly from a first side of central post structure in a first direction and a second lateral rib projecting outwardly from a second side of the central post structure in a second direction, the first direction being substantially opposite from the second direction, the first lateral rib and the second lateral rib each being disposed in planes outside of the travel paths defined by the wing elements, with the first lateral rib and the second lateral rib being disposed on opposite sides of the travel paths defined by the wing elements.

9. The fastener assembly as recited in claim 8, wherein the first component includes at least one blocking detent extending away from the contoured face, said at least one locking detent adapted to project through a corresponding one of said plurality of cut-outs when the first component is disposed in sandwiched relation between the raised edge collar and the opposing platform surface.

10. The fastener assembly as recited in claim 9, wherein said at least one locking detent has a ramp configuration.

* * * * *